US010893488B2

(12) United States Patent
Khawand et al.

(10) Patent No.: US 10,893,488 B2
(45) Date of Patent: Jan. 12, 2021

(54) RADIO FREQUENCY (RF) POWER BACK-OFF OPTIMIZATION FOR SPECIFIC ABSORPTION RATE (SAR) COMPLIANCE

(71) Applicant: Microsoft Corporation, Redmond, WA (US)

(72) Inventors: Charbel Khawand, Redmond, WA (US); Sean Russell Mercer, Issaquah, WA (US); Mahesh M. Pai, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1017 days.

(21) Appl. No.: 13/918,846

(22) Filed: Jun. 14, 2013

(65) Prior Publication Data

US 2014/0370929 A1  Dec. 18, 2014

(51) Int. Cl.
*H04W 52/36* (2009.01)
*H04B 1/3827* (2015.01)

(52) U.S. Cl.
CPC ........ *H04W 52/367* (2013.01); *H04B 1/3838* (2013.01)

(58) Field of Classification Search
CPC .................... H04W 52/367; H04B 1/3838
See application file for complete search history.

(56) References Cited

U.S. PATENT DOCUMENTS

| | | |
|---|---|---|
| 4,016,490 A | 4/1977 | Weckenmann et al. |
| 4,729,129 A | 3/1988 | Koerner |
| 4,806,944 A | 2/1989 | Jacomb-Hood |
| 5,166,679 A | 11/1992 | Vranish et al. |

(Continued)

FOREIGN PATENT DOCUMENTS

| | | |
|---|---|---|
| CN | 1123476 A | 5/1996 |
| CN | 1179864 A | 4/1998 |

(Continued)

OTHER PUBLICATIONS

"Specific Absorption Rate Mitigation", U.S. Appl. No. 13/905,088, filed May 29, 2013, pp. 52.

(Continued)

*Primary Examiner* — Dong-Chang Shiue
(74) *Attorney, Agent, or Firm* — Holzer Patel Drennan (57) ABSTRACT

Radio Frequency (RF) power back-off optimization techniques are described for specific absorption rate (SAR) compliance. A mobile device may be configured to intelligently modify antennas and radio device transmission levels to maintain compliance with SAR limits while minimally perturbing radio operations. The mobile device may implement a SAR optimization scheme that accounts for user presence and signal conditions to maintain compliance. Rather than setting a fixed back-off, user presence detectors may be employed along with information on current signal conditions to determine potential for excessive SAR exposure and selectively apply variable adjustments to RF transmission power (e.g., "back-offs"), accordingly. The mobile device may also be configured to report SAR conditions and/or mitigation actions to a base station to enable the base station to manage a connection to services based at least in part upon knowledge of SAR actions taken by the mobile computing device.

21 Claims, 5 Drawing Sheets

(56) References Cited

U.S. PATENT DOCUMENTS

| | | |
|---|---|---|
| 5,212,621 A | 5/1993 | Panter |
| 5,408,690 A | 4/1995 | Ishikawa et al. |
| 5,564,086 A | 10/1996 | Cygan et al. |
| 6,178,310 B1 | 1/2001 | Jeong, II |
| 6,657,595 B1 | 12/2003 | Phillips et al. |
| 6,989,745 B1 | 1/2006 | Milinusic et al. |
| 7,009,944 B1 | 3/2006 | Hulbert |
| 7,053,629 B2 | 5/2006 | Nevermann |
| 7,062,288 B2 | 6/2006 | Raaf et al. |
| 7,071,776 B2 | 7/2006 | Forrester et al. |
| 7,124,193 B1 | 10/2006 | Raaf et al. |
| 7,146,139 B2 | 12/2006 | Nevermann |
| 7,151,382 B1 | 12/2006 | Kean et al. |
| 7,162,264 B2 | 1/2007 | Vance |
| 7,167,093 B2 | 1/2007 | Fergusson |
| 7,541,874 B2 | 6/2009 | Maeda et al. |
| 7,729,715 B2 | 6/2010 | Love et al. |
| 7,917,175 B2 | 3/2011 | Song et al. |
| 8,063,375 B2 | 11/2011 | Cobbinah et al. |
| 8,134,461 B2 | 3/2012 | Van Doorn |
| 8,208,423 B2 | 6/2012 | Liu et al. |
| 8,213,982 B2 | 7/2012 | Marlett et al. |
| 8,269,511 B2 | 9/2012 | Jordan |
| 8,324,549 B2 | 12/2012 | Romero et al. |
| 8,326,385 B2 | 12/2012 | Brogle et al. |
| 8,401,851 B2 | 3/2013 | Bushey |
| 8,417,296 B2 | 4/2013 | Caballero et al. |
| 8,432,322 B2 | 4/2013 | Amm et al. |
| 8,442,572 B2 | 5/2013 | Borran et al. |
| 8,466,839 B2 | 6/2013 | Schlub et al. |
| 8,483,632 B2 | 7/2013 | Asrani et al. |
| 8,515,496 B2 | 8/2013 | Cheng et al. |
| 8,520,586 B1 * | 8/2013 | Husted .................. H04W 74/08 370/318 |
| 8,547,952 B2 | 10/2013 | Liu et al. |
| 8,548,388 B2 | 10/2013 | Chiu et al. |
| 8,559,999 B2 | 10/2013 | Hu et al. |
| 8,565,205 B2 | 10/2013 | Ho et al. |
| 8,577,289 B2 | 11/2013 | Schlub et al. |
| 8,630,596 B2 | 1/2014 | Harel et al. |
| 8,723,531 B2 | 5/2014 | Harrison |
| 8,723,749 B2 | 5/2014 | Lin et al. |
| 8,775,193 B2 | 5/2014 | Jayaraj et al. |
| 8,775,103 B1 | 7/2014 | Jayaraj et al. |
| 8,781,437 B2 | 7/2014 | Ngai et al. |
| 8,792,930 B1 | 7/2014 | Gapalakrishnan et al. |
| 8,798,695 B1 | 8/2014 | Zheng et al. |
| 8,860,526 B2 | 10/2014 | Manssen et al. |
| 8,922,443 B2 | 12/2014 | Zhu et al. |
| 8,975,903 B2 | 3/2015 | Salter et al. |
| 9,325,355 B2 | 4/2016 | Pecen et al. |
| 9,337,833 B2 | 5/2016 | Siska |
| 9,466,872 B2 | 10/2016 | Sanchez et al. |
| 9,531,420 B1 | 12/2016 | Prendergast et al. |
| 9,785,174 B2 | 10/2017 | Khawand et al. |
| 10,224,974 B2 | 3/2019 | Mercer et al. |
| 2002/0009976 A1 | 1/2002 | Rashidi |
| 2002/0039028 A1 | 4/2002 | Douglas et al. |
| 2002/0175814 A1 | 11/2002 | Wadlow et al. |
| 2003/0064732 A1 | 4/2003 | McDowell et al. |
| 2003/0064761 A1 * | 4/2003 | Nevermann ......... H04B 1/3838 455/572 |
| 2003/0203720 A1 | 10/2003 | Oosawa et al. |
| 2003/0210203 A1 | 11/2003 | Phillips et al. |
| 2003/0214310 A1 | 11/2003 | McIntosh |
| 2003/0228846 A1 | 12/2003 | Berliner et al. |
| 2004/0021608 A1 | 2/2004 | Kojima et al. |
| 2004/0075613 A1 | 4/2004 | Jarmuszewski et al. |
| 2004/0108957 A1 | 6/2004 | Umehara et al. |
| 2004/0113847 A1 | 6/2004 | Qi et al. |
| 2004/0160378 A1 | 8/2004 | Abrams et al. |
| 2004/0219893 A1 | 11/2004 | Takano et al. |
| 2004/0222925 A1 | 11/2004 | Fabrega-Sanchez et al. |
| 2005/0017906 A1 | 1/2005 | Man et al. |
| 2005/0093624 A1 | 5/2005 | Forrester et al. |
| 2005/0184914 A1 | 8/2005 | Ollikainen et al. |
| 2006/0244663 A1 | 11/2006 | Fleck et al. |
| 2007/0037619 A1 | 2/2007 | Matsunaga et al. |
| 2007/0111681 A1 | 5/2007 | Alberth, Jr. et al. |
| 2007/0120745 A1 | 5/2007 | Qi et al. |
| 2007/0122307 A1 | 5/2007 | Da Costa, et al. |
| 2008/0051165 A1 | 2/2008 | Burgan et al. |
| 2008/0055160 A1 | 3/2008 | Yong-Jin et al. |
| 2008/0158065 A1 | 7/2008 | Wee |
| 2008/0218493 A1 | 9/2008 | Patten et al. |
| 2008/0254836 A1 | 10/2008 | Qi et al. |
| 2009/0033562 A1 | 2/2009 | Takeuchi et al. |
| 2009/0047998 A1 | 2/2009 | Alberth, Jr. |
| 2009/0230884 A1 | 9/2009 | Van Doorn |
| 2009/0253459 A1 | 10/2009 | Naganuma et al. |
| 2009/0295648 A1 | 12/2009 | Dorsey et al. |
| 2009/0305742 A1 | 12/2009 | Caballero |
| 2009/0325511 A1 | 12/2009 | Kim |
| 2010/0026664 A1 | 2/2010 | Geaghan |
| 2010/0052997 A1 | 3/2010 | Kan et al. |
| 2010/0056210 A1 | 3/2010 | Bychkov et al. |
| 2010/0067419 A1 | 3/2010 | Liu et al. |
| 2010/0113111 A1 | 5/2010 | Wong et al. |
| 2010/0234058 A1 | 9/2010 | Hu et al. |
| 2010/0234081 A1 | 9/2010 | Wong et al. |
| 2010/0279751 A1 | 11/2010 | Pourseyed et al. |
| 2010/0283671 A1 | 11/2010 | Levin et al. |
| 2010/0283691 A1 | 11/2010 | Xiaomeng et al. |
| 2010/0317302 A1 | 12/2010 | Greenwood et al. |
| 2010/0321325 A1 | 12/2010 | Springer et al. |
| 2011/0001675 A1 | 1/2011 | Lee |
| 2011/0012793 A1 | 1/2011 | Amm et al. |
| 2011/0012794 A1 | 1/2011 | Schlub et al. |
| 2011/0043408 A1 | 2/2011 | Shi et al. |
| 2011/0063042 A1 | 3/2011 | Mendolia et al. |
| 2011/0117973 A1 | 5/2011 | Asrani et al. |
| 2011/0124363 A1 | 5/2011 | Calvarese et al. |
| 2011/0157077 A1 | 6/2011 | Martin et al. |
| 2011/0199267 A1 | 8/2011 | Hayashi |
| 2011/0222469 A1 | 9/2011 | Ali et al. |
| 2011/0250928 A1 | 10/2011 | Schlub et al. |
| 2011/0298669 A1 | 12/2011 | Rao |
| 2012/0021707 A1 | 1/2012 | Forrester et al. |
| 2012/0021800 A1 | 1/2012 | Wilson et al. |
| 2012/0023225 A1 | 1/2012 | Imes et al. |
| 2012/0032951 A1 | 2/2012 | Lee et al. |
| 2012/0044115 A1 | 2/2012 | Mccaughey et al. |
| 2012/0071195 A1 * | 3/2012 | Chakraborty ........ H04B 1/3838 455/522 |
| 2012/0074961 A1 | 3/2012 | Herrmann |
| 2012/0077538 A1 | 3/2012 | Yun |
| 2012/0108188 A1 | 5/2012 | Matsumoto et al. |
| 2012/0133561 A1 | 5/2012 | Konanur et al. |
| 2012/0147801 A1 * | 6/2012 | Ho ..................... H04W 52/365 370/311 |
| 2012/0164962 A1 | 6/2012 | Lin et al. |
| 2012/0172079 A1 | 7/2012 | Baldemair et al. |
| 2012/0178494 A1 | 7/2012 | Haim et al. |
| 2012/0190398 A1 | 7/2012 | Leukkunen |
| 2012/0214422 A1 | 8/2012 | Shi et al. |
| 2012/0223865 A1 | 9/2012 | Li et al. |
| 2012/0231784 A1 | 9/2012 | Kazmi |
| 2012/0270519 A1 | 10/2012 | Ngai et al. |
| 2012/0270592 A1 | 10/2012 | Ngai et al. |
| 2012/0276861 A1 | 11/2012 | Isobe et al. |
| 2012/0295554 A1 | 11/2012 | Greene et al. |
| 2012/0298497 A1 | 11/2012 | Maeda et al. |
| 2012/0299772 A1 | 11/2012 | Shtrom et al. |
| 2012/0315847 A1 | 12/2012 | Li et al. |
| 2012/0329517 A1 | 12/2012 | Elin |
| 2012/0329524 A1 | 12/2012 | Kent et al. |
| 2013/0005413 A1 | 1/2013 | Brogle et al. |
| 2013/0016621 A1 | 1/2013 | Kil et al. |
| 2013/0026846 A1 | 1/2013 | Gianesello et al. |
| 2013/0033400 A1 | 2/2013 | Chiang |
| 2013/0045700 A1 | 2/2013 | Stallman et al. |
| 2013/0050046 A1 | 2/2013 | Jarvis et al. |
| 2013/0051261 A1 | 2/2013 | Kazmi et al. |
| 2013/0060517 A1 | 3/2013 | Sanchez |

(56) References Cited

U.S. PATENT DOCUMENTS

| | | |
|---|---|---|
| 2013/0120257 A1 | 5/2013 | Park et al. |
| 2013/0122827 A1* | 5/2013 | Ali .................. H04B 1/3838 455/77 |
| 2013/0127677 A1 | 5/2013 | Lin et al. |
| 2013/0133827 A1 | 5/2013 | Cho |
| 2013/0137487 A1 | 5/2013 | Sato |
| 2013/0149957 A1 | 6/2013 | Desclos et al. |
| 2013/0157564 A1 | 6/2013 | Curtis et al. |
| 2013/0169348 A1* | 7/2013 | Shi .................. H04B 1/3838 327/517 |
| 2013/0178167 A1 | 7/2013 | Lockerbie et al. |
| 2013/0178174 A1 | 7/2013 | Geris et al. |
| 2013/0203363 A1 | 8/2013 | Gratt et al. |
| 2013/0210477 A1 | 8/2013 | Peter et al. |
| 2013/0217342 A1 | 8/2013 | Abdul-gaffoor et al. |
| 2013/0241670 A1 | 9/2013 | Mikhemar et al. |
| 2013/0278474 A1 | 10/2013 | Lenormand et al. |
| 2013/0293244 A1 | 11/2013 | Leek |
| 2013/0300618 A1 | 11/2013 | Yarga et al. |
| 2013/0310105 A1 | 11/2013 | Sagae et al. |
| 2013/0310106 A1 | 11/2013 | Wang et al. |
| 2013/0314365 A1 | 11/2013 | Woolley et al. |
| 2013/0335291 A1 | 12/2013 | Judson et al. |
| 2014/0015547 A1 | 1/2014 | Bottomley et al. |
| 2014/0015595 A1 | 1/2014 | Van Ausdall et al. |
| 2014/0021801 A1 | 1/2014 | Kao et al. |
| 2014/0071008 A1 | 3/2014 | Desclos et al. |
| 2014/0078094 A1 | 3/2014 | Yang |
| 2014/0087663 A1 | 3/2014 | Burchill et al. |
| 2014/0098491 A1 | 4/2014 | Wang |
| 2014/0098693 A1 | 4/2014 | Tabet et al. |
| 2014/0066124 A1 | 5/2014 | Novet |
| 2014/0128032 A1 | 5/2014 | Muthukumar |
| 2014/0139380 A1 | 5/2014 | Ouyang et al. |
| 2014/0141733 A1 | 5/2014 | Wong et al. |
| 2014/0152121 A1 | 6/2014 | Ku |
| 2014/0155000 A1 | 6/2014 | Erkens |
| 2014/0159980 A1 | 6/2014 | Finegold |
| 2014/0173269 A1 | 6/2014 | Varoglu et al. |
| 2014/0176938 A1 | 6/2014 | Yang et al. |
| 2014/0177371 A1 | 6/2014 | Abbasi et al. |
| 2014/0206297 A1 | 7/2014 | Schlub et al. |
| 2014/0274188 A1* | 9/2014 | Thorson .................. H04W 52/04 455/522 |
| 2014/0274189 A1 | 9/2014 | Moller et al. |
| 2014/0280450 A1 | 9/2014 | Luna |
| 2014/0292587 A1 | 10/2014 | Yarga et al. |
| 2014/0307570 A1 | 10/2014 | Hong |
| 2014/0315592 A1 | 10/2014 | Schlub et al. |
| 2014/0357207 A1 | 12/2014 | Mz |
| 2014/0357313 A1 | 12/2014 | Mercer et al. |
| 2014/0370929 A1 | 12/2014 | Khawand et al. |
| 2015/0022206 A1 | 1/2015 | Adolf et al. |
| 2015/0031408 A1 | 1/2015 | Kalla et al. |
| 2015/0053575 A1 | 2/2015 | Bridges et al. |
| 2015/0141080 A1 | 5/2015 | Standing |
| 2015/0169093 A1 | 6/2015 | Nakao |
| 2015/0177371 A1 | 6/2015 | Abbasi et al. |
| 2015/0199042 A1 | 7/2015 | Standing et al. |
| 2015/0200444 A1 | 7/2015 | Mercer et al. |
| 2015/0201385 A1 | 7/2015 | Mercer et al. |
| 2015/0201387 A1 | 7/2015 | Khawand et al. |
| 2015/0288074 A1 | 10/2015 | Harper et al. |
| 2015/0382307 A1 | 12/2015 | Harper et al. |
| 2016/0028234 A1 | 1/2016 | Watanabe et al. |
| 2016/0049978 A1 | 2/2016 | Mercer et al. |
| 2016/0098053 A1 | 4/2016 | Khawand et al. |
| 2016/0164563 A1 | 6/2016 | Khawand et al. |
| 2016/0064801 A1 | 7/2016 | Lee et al. |
| 2016/0204836 A1 | 7/2016 | Lee et al. |
| 2017/0093504 A1 | 3/2017 | Sutskover et al. |
| 2018/0287650 A1 | 10/2018 | Mercer et al. |
| 2019/0253095 A1 | 8/2019 | Mercer et al. |

FOREIGN PATENT DOCUMENTS

| | | |
|---|---|---|
| CN | 100504407 C | 9/2006 |
| CN | 102064812 A | 5/2011 |
| CN | 102077234 A | 5/2011 |
| CN | 202276339 U | 6/2012 |
| CN | 102714346 A | 10/2012 |
| CN | 102835036 A | 12/2012 |
| CN | 103248747 | 8/2013 |
| CN | 103270799 A | 8/2013 |
| CN | 103688575 A | 3/2014 |
| CN | 103703840 A | 4/2014 |
| CN | 103931051 A | 7/2014 |
| CN | 104170265 A | 11/2014 |
| CN | 104224181 A | 12/2014 |
| EP | 0843421 | 5/1998 |
| EP | 1298809 | 4/2003 |
| EP | 1469550 A3 | 12/2004 |
| EP | 1732167 A1 | 12/2006 |
| EP | 2015548 B1 | 2/2010 |
| EP | 2276108 A1 | 1/2011 |
| EP | 2381527 A1 | 10/2011 |
| EP | 2383364 | 11/2011 |
| EP | 2405534 A1 | 1/2012 |
| EP | 2410661 | 1/2012 |
| EP | 2509229 | 10/2012 |
| EP | 2509229 A1 | 10/2012 |
| EP | 2568605 A1 | 3/2013 |
| EP | 2787780 | 10/2014 |
| GB | 2293277 A | 3/1996 |
| GB | 2380359 | 4/2003 |
| GB | 2409345 A | 6/2005 |
| JP | 2002043957 A | 2/2002 |
| JP | 2007194995 A | 8/2007 |
| WO | 9517044 A1 | 6/1995 |
| WO | 200042797 | 7/2000 |
| WO | WO-0042797 | 7/2000 |
| WO | 0148858 A2 | 7/2001 |
| WO | 200148848 A3 | 7/2001 |
| WO | 2004015813 A3 | 2/2004 |
| WO | 2004091046 A1 | 10/2004 |
| WO | 20050018046 A1 | 2/2005 |
| WO | 2007043150 A1 | 4/2007 |
| WO | 20090149023 A1 | 12/2009 |
| WO | 2011058128 A1 | 5/2011 |
| WO | WO-2011051554 | 5/2011 |
| WO | 2012152103 A1 | 2/2012 |
| WO | WO-2012061582 | 5/2012 |
| WO | WO-2012091651 | 7/2012 |
| WO | WO 2012091651 A1 * | 7/2012 ......... H04W 52/367 |
| WO | 2012109952 A1 | 8/2012 |
| WO | 2012113754 | 8/2012 |
| WO | 2012122113 A1 | 9/2012 |
| WO | WO-2012122116 | 9/2012 |
| WO | 2012143936 | 10/2012 |
| WO | WO-2012176217 | 12/2012 |
| WO | 2012011352 A1 | 1/2013 |
| WO | 2013101106 | 7/2013 |
| WO | 2013103948 | 7/2013 |
| WO | 2013141791 A1 | 9/2013 |
| WO | WO-2013165419 | 11/2013 |
| WO | WO-2013169527 | 11/2013 |
| WO | 2014036532 A1 | 3/2014 |
| WO | 2015134117 A1 | 9/2015 |
| WO | 2016111897 A1 | 7/2016 |

OTHER PUBLICATIONS

"Low SAR Solution for Tablet PC", Available at <<http://www.auden.com.tw/TRC/webspace/disk/AudenSARSolutiondatasheet 110927.pdf>, (Sep. 27, 2011), 2 pages.

"Semtech Launches Smart Proximity Sensor for Short-Range Human Presence Detection & SAR Regulations in Mobile & Tablet PC Applications", Retrieved from: <Retrieved at <<http://www.semtech.com/Press-Releases/2012/Semtech-Launches-Smart-Proximity-Sensor-for-Short-Range-Human-Presence-Detection-SAR-Regulations-in-Mobile-Tablet-PCApplications.html> on Mar. 21, 2013, (Jul. 24, 2012), 2 pages.

(56) References Cited

OTHER PUBLICATIONS

Toit, Riaan Du "Using Proximity Sensing to Meet Mobile Device FCC SAR Regulations", Retrieved from: <http://www.eetimes.com/General/PrintView/4371201> on Mar. 21, 2013, (Apr. 17, 2013), 5 pages.
"International Search Report and Written Opinion", Application No. PCT/US2014/072411, dated Mar. 27, 2015, 10 pages.
"International Search Report and Written Opinion", Application No. PCT/US2014/072412, dated Mar. 30, 2015, 12 pages.
"International Search Report and Written Opinion", Application No. PCT/US2014/072414, dated Apr. 14, 2015, 9 Pages.
"Non-Final Office Action", U.S. Appl. No. 13/905,088, dated Mar. 23, 2015, 37 pages.
"Non-Final Office Action", U.S. Appl. No. 14/152,351, dated Feb. 20, 2015, 9 pages.
"Second Written Opinion", Application No. PCT/US2014/042023, dated Mar. 2, 2015, 6 Pages.
Mrazovac,"Reaching the Next Level of Indoor Human Presence Detection: An RF Based Solution", 11th International Conference on Telecommunications in Modern Satellite, Cable and Broadcasting Services, Oct. 16, 2013, 4 pages.
"Digital, Silicon Microphone has 2.6 × 1.6 mm$^2$ Footprint", Available at: http://news.thomasnet.com/fullstory/Digital-Silicon-Microphone-has-2-6-x-1-6-mm-footprint-471386, Dec. 28, 2005, 2 pages.
Holopainen, et al., "Broadband Equivalent Circuit Model for Capacitive Coupling Element-Based Mobile Terminal Antenna", In IEEE Antennas and Wireless Propagation Letters, vol. 9,, Jul. 8, 2010, pp. 716-719.
Khawand, et al., "Radio Frequency (RF) Power Back-Off Optimization for Specific Absorption Rate (SAR) Compliance", U.S. Appl. No. 13/918,846, Jun. 14, 2013, 40 pages.
Ozyalcin, et al., "SAR Simulations in Wireless Communication and Safety Discussions in the Society", In Proceedings of Turkish Journal of Electrical Engineering & Computer Sciences, vol. 10, Issue 2, Retrieved from <http://www3.dogus.edu.tr/Isevgi/LSevgi/FULL/2002-O.pdf> on Dec. 31, 2013, 2002, 16 pages.
"Restriction Requirement", U.S. Appl. No. 13/905,088, dated Jan. 9, 2015, 9 pages.
"International Preliminary Report on Patentability", Application No. PCT/US2014/039479, dated Jun. 15, 2015, 8 pages.
"Notice of Allowance", U.S. Appl. No. 13/905,088, dated Jul. 31, 2015, 6 pages.
"Notice of Allowance", U.S. Appl. No. 14/152,351, dated Jul. 7, 2015, 8 pages.
"International Search Report and Written Opinion", Application No. PCT/US2014/042023, dated Aug. 29, 2014, 11 Pages.
"International Search Report and Written Opinion", Application No. PCT/US2014/039479, dated Sep. 19, 2014, 11 Pages.
"Non-Final Office Action", U.S. Appl. No. 14/152,652, dated Apr. 18, 2016 9 pages.
"Final Office Action Issued in U.S. Appl. No. 14/927,287", dated May 11, 2016, 34 Pages.
International Preliminary Report of Patentability issued in PCT Application No. PCT/US2014/072412 dated Mar. 22, 2016, 7 pages.
International Preliminary Examining Authority, International Preliminary Report on Patentability for PCT/US2014/072413 dated Mar. 24, 2016, 7 pages.
Second Written Opinion Issued in PCT Application No. PCT/US2014/072413, dated Dec. 17, 2015, 6 Pages.
Khawand, et al., "Radiating Structure with Integrated Proximity Sensing" formerly titled as "SAR Sensor Execution where Part of One or More Antennas is on the Exterior Surface of a Mobile Device", US Patent Application.
U.S. Appl. No. 13/918,846, Pai, et al., "Radio Frequency (RF) Power Back-Off Optimization for Specific Absorption Rate (SAR) Compliance", filed Jun. 14, 2013.
Mercer, et al., "Specific Absorption Rate Mitigation", U.S. Appl. No. 13/905,088, filed May 19, 2013, 53 pages.

I.B. Bonev et al, "Parmetric Study of Antenna with Parasitic Element for Improving the Hearing Aids Compatibility of Mobile Phones and the Specific Absorption Rate in the Head", Proceedings in Progress in Electromagnetics Research Symposium, Marrakesh, Morocco, Mar. 20-23, 2011, 5 pages.
J. Poutanen, "Interaction Between Mobile Terminal Antenna and User" Helsinki University of Technology Master's Thesis, Oct. 9, 2007, 100 pages.
Sterner, et al., "Development of an Antenna Sensor for Occupant Detection in Passenger Transportation", In Proceedings of Procedia Engineering, vol. 47, Sep. 9, 2012, 6 pages.
Poutantent, et al., "Behavior of Mobile Terminal Antennas near Human Tissue at a Wide Frequency Range", In International Workshop on Antenna Technology: Small Antennas and Novel Metamaterials, Mar. 4, 2008, 4 pages.
Curto, et al., "Circular Loop Antenna Operating at 434 MHz for Medical Applications: Loop-Tissue Interaction", In Proceeding of: Irish Signals and Systems Conference, Jul. 2006, 6 pages.
International Searching Authority, U.S. Patent and Trademark Office, Updated Search Report for PCT/US2014/072412, dated Aug. 5, 2015, 3 pages.
International Searching Authority, U.S. Patent and Trademark Office, Updated Written Opinion for PCT/US2014/072412, dated Oct. 5, 2015, 8 pages.
"SAR Evaluation Considerations for Laptop, Notebook, Netbook and Tablet Computers," Federal Communications Commission Office of Engineering and Technology Laboratory Division, May 28, 2013, 14 pages.
Hochwald, et al "Minimizing Exposure to Electromagnetic Radiation in Portable Devices", In Proceedings of Information Theory and Applications Workshop, Feb. 5, 2012, pp. 107.
International Searching Authority, United States Patent and Trademark Office, International Preliminary Report on Patentability, Application No. PCT/US2014/039479, dated Jun. 15, 2015, 8 pages.
International Searching Authority, United States Patent and Trademark Office, Second International Search Report and Written Opinion for PCT/US2014/072412; dated Oct. 5, 2015, 11 pages.
International Searching Authority, United States Patent and Trademark Office, Search Report and Written Opinion for PCT/US2014/065856, dated Feb. 4, 2015, 10 pages.
International Searching Authority, United States Patent and Trademark Office, Second Written Opinion of IPEA for PCT/US2014/065856, dated Oct. 13, 2015, 6 pages.
International Searching Authority, U.S. Patent and Trademark Office, International Search Report and Written Opinion for PCT/US2015/037563, dated Aug. 20, 2015, mailed Aug. 31, 2015, 11 pages.
International Searching Authority, U.S. Patent and Trademark Office,Written Opinion of International Preliminary Examining Authority for PCT/US2014/072412, dated Dec. 4, 2015, 5 pages.
International Searching Authority, U.S. Patent and Trademark Office, International Search Report and Written Opinion for PCT/US2014/072413 dated Jul. 16, 2015, 16 pages.
International Searching Authority, U.S. Patent and Trademark Office, Written Opinion of the International Preliminary Examining Authority for PCT/US2014/072413 dated Dec. 17, 2015, 6 pages.
International Preliminary Examining Authority, International Preliminary Report on Patentability for PCT/US2014/065856, dated Feb. 10, 2016, 8 pages.
International Preliminary Examining Authority, Second Written Opinion of the International Preliminary Examining Authority for PCT/2014/065856, dated Oct. 13, 2015, 6 pages.
International Searching Authority, U.S. Patent and Trademark Office, International Search Report and Written Opinion for PCT/US2015/052769, dated Feb. 17, 2016, 27 pages.
International Preliminary Examining Authority, International Preliminary Report on Patentability for PCT/US2014/072411; dated Mar. 23, 2016, 8 pages.
Office Action Issued in Columbian Patent Application No. NC2016/0000122, dated Aug. 19, 2016, 2 Pages.
Myllymaki, "Capacitive Antenna Sensor for User Proximity Recognition"; Academic dissertation to be presented with the assent of the Doctoral Training Committee of Technology and Natural Sci- (56) References Cited

OTHER PUBLICATIONS ences of the University of Oulu for public defence in Arina-sali (Auditorium TA105), Linnanmaa, dated Nov. 30, 2012, 59 pages.
Rogerson, James, "Samsung reveals a folding phone-to-tablet prototype", http://www.techradar.com/us/news/phone-and-communications/mobile..nes/samsung-reveals-a-folding-phone-to-tablet-prototype-1197384,7 pages.
Mercer, et al., "Dynamic Antenna Power Control for Multi-Context Device", U.S. Appl. No. 14/987,964, filed Jan. 5, 2016, 52 pages.
"Non-Final Office Action", U.S. Appl. No. 14/152,652, dated Jul. 16, 2015, 9 pages.
"Non-Final Office Action", U.S. Appl. No. 14/152,086, dated Jul. 22, 2015, 13 pages.
"Non-Final Office Action", U.S. Appl. No. 14/152,529, dated Sep. 22, 2015, 18 pages.
"Non-Final Office Action", U.S. Appl. No. 14/152,086, dated Nov. 30, 2015, 19 pages.
"Non-Final Office Action", U.S. Appl. No. 14/562,212, dated Dec. 18, 2015, 16 pages.
"Non-Final Office Action", U.S. Appl. No. 14/927,287, dated Dec. 21, 2015, 28 pages.
"Final Office Action", U.S. Appl. No. 14/152,652, dated Dec. 23, 2016, 9 pages.
"Non-Final Office Action", U.S. Appl. No. 14/320,320, dated Jan. 21, 2016, 9 pages.
"Non-Final Office Action", U.S. Appl. No. 14/152,529, dated Jan. 22, 2016, 18 pages.
Office Action Issued in United Kingdom Patent Application No. 1219096.3, dated Jan. 28, 2016, 4 Pages.
"Non-Final Office Action", U.S. Appl. No. 14/086,866, dated May 19, 2016, 7 pages.
Office Action Issued in Chinese Patent Application No. 201380055749.X, dated Jun. 6, 2016, 12 Pages.
"Final Office Action", U.S. Appl. No. 14/562,212, dated Jun. 17, 2016, 17 pages.
"Final Office Action", U.S. Appl. No. 14/320,320, dated Jul. 29, 2016, 10 pages.
International Searching Authority, United States Patent and Trademark Office, International Search Report and Written Opinion for Application No. PCT/US2013/066441, dated Dec. 12, 2013, 12 Pages.
International Preliminary Examining Authority, United States Patent and Trademark Office, International Preliminary Report on Patentability, Application No. PCT/US2013/066441, dated May 7, 2015, 9 pages.
Second Written Opinion Issued in PCT Application No. PCT/US2014/072411, dated Nov. 26, 2015, 7 Pages.
International Searching Authority, U.S. Patent and Trademark Office, Second Written Opinion of the International Preliminary Examining Authority for PCT/US2014/072414 dated Dec. 9, 2015, 29 pages.
International Seraching Authority, U.S. Patent and Trademark Office, International Search Report and Written Opinion for PCT/US2015/062851, dated Feb. 5, 2016, 11 pages.
International Preliminary Examining Authority, International Preliminary Report on Patentability for PCT/US2014/072414; dated Mar. 23, 2016, 7 pages.
International Preliminary Examining Authority, Second Written Opinion of the International Preliminary Examining Authority for PCT/2015/037563, dated Jun. 1, 2016, 5 pages.
Second Written Opinion Issued in PCT Application No. PCT/US2015/052769, dated Jul. 7, 2016, 5 Pages.
"Non-Final Office Action", U.S. Appl. No. 14/086,866, dated Oct. 17, 2016, 7 pages.
First Office Action and Search Report Issued in Chinese Patent Application No. 201480031132.9, dated Nov. 2, 2016, 10 Pages.
International Preliminary Examining Authority, International Preliminary Report on Patentability for PCT/US2015/037563, dated Sep. 13, 2016, 17 pages.

International Preliminary Examining Authority, International Preliminary Report on Patentability for PCT/US2015/052769, dated Sep. 29, 2016, 16 pages.
International Searching Authority, U.S. Patent and Trademark Office, Second Written Opinion of the International Preliminary Examining Authority for PCT/US2015/062851, dated Oct. 28, 2016, 8 pages.
Ban, et al., "A Dual-Loop Antenna Design for Hepta-Band WWAN/LTE Metal-Rimmed Smartphone Applications", In Journal of IEEE Transactions on Antennas and Propagation, vol. 63, Issue 1, Jan. 2015, 8 pages.
Chung, et al., "A dual-mode antenna for wireless charging and Near Field Communication", In Proceedings of EEE International Symposium on Antennas and Propagation & USNC/URSI National Radio Science Meeting, Jul. 24, 2015, 5 pages.
Design of Printed Trace Differential Loop Antennas, http://www.silabs.com/Support%20Documents/TechnicalDocs/AN639.pdf, Retrieved on: Nov. 17, 2016, 28 pages.
Mumcu, et al., "Small Wideband Double-Loop Antennas Using Lumped Inductors and Coupling Capacitors", In Journal of IEEE Antennas and Wireless Propagation Letters, vol. 10, Feb. 4, 2011, 5 pages.
Osoinach, Bryce, "Proximity Capacitive Sensor Technology for Touch Sensing Applications", In White Paper of Proximity Sensing, 2007, 7 pages.
Pal, et al., "A low-profile switched-beam dual-band capacitively coupled Square Loop Antenna", In Proceedings of Antennas and Propagation Conference, Nov. 11, 2013, 5 Pages.
Pal, et al., "Dual-Band Low-Profile Capacitively Coupled Beam-Steerable Square-Loop Antenna", In Journal of IEEE Transactions on Antennas and Propagation, vol. 62, Issue 3, Mar. 2014, pp. 1204-1211.
Quddious, et al., "An inkjet printed meandered dipole antenna for RF passive sensing applications", In Proceedings of 10th European Conference on Antennas and Propagation, Apr. 2016, 4 Pages.
Standing, et al., "Radiofrequency-Wave-Transparent Capacitive Sensor Pad", U.S. Appl. No. 15/384,742, filed Dec. 20, 2016, 26 pages.
Harper et al., "Active Proximity Sensor With Adaptive Electric Field Control", U.S. Appl. No. 15/413,196, filed Jan. 23, 2016, 35 pages.
Harper, "Loop Antenna With Integrated Proximity Sensing", U.S. Appl. No. 15/412,997, filed Jan. 23, 2016, 32 pages.
"Non-Final Office Action", U.S. Appl. No. 14/987,964, dated Nov. 30, 2016, 8 pages.
Office Action and Search Report Issued in Chinese Patent Application No. 201480033869.4, dated Dec. 19, 2016, 7 Pages.
"Second Office Action Issued in Chinese Patent Application No. 201380055749.X", dated Jan. 25, 2017, 10 Pages.
International Preliminary Examining Authority, International Preliminary Report on Patentability for PCT/US2015/062851, dated Feb. 22, 2017, 19 pages.
Monebhurrun, et al., "A Novel Measurement Procedure for the Specific Absorption Rate Conformity Assessment of WiFi Devices", In Proceedings of Asia Pacific Microwave Conference, Dec. 1, 2009, pp. 401-404.
Office Action and Search Report Issued in Chinese Patent Application No. 201480063903.02, dated Apr. 19, 2017, 11 Pages.
"Office Action Issued in Chinese Patent Application No. 201380055749.X", dated Jun. 12, 2017, 8 Pages.
"Second Office Action Issued in Chinese Patent Application No. 2014800311329.9", dated Jul. 26, 2017, 11Pages.
International Searching Authority, U.S. Patent and Trademark Office, International Search Report and Written Opinion for PCT/US2016/069056, dated Mar. 31, 2017, 17 pages.
Mercer, "Proximity-Independent SAR Mitigation", U.S. Appl. No. 15/674,959, filed Aug. 11, 2017, 55 pages.
"Final Office Action Issued in U.S. Appl. No. 14/506,478", dated Dec. 2, 2016, 9 Pages.
"Non Final Office Action Issued in U.S. Appl. No. 14/506,478", dated Jul. 1, 2016, 10 Pages.
"Non Final Office Action Issued in U.S. Appl. No. 14/506,478", dated Feb. 10, 2017, 11 Pages.
"Office Action Issued in European Patent Application No. 14742612.6", dated Nov. 20, 2018, 5 Pages.

(56) References Cited

OTHER PUBLICATIONS

"Second Office Action Issued in Chinese Patent Application No. 201480033869.4", dated Aug. 21, 2017, 4 Pages.

"First Office Action and Search Report Issued in Chinese Patent Application No. 201580054069.5", dated Oct. 18, 2017, 17 Pages.

"Second Office Action Issued in Chinese Patent Application No. 201580054069.5", dated Jun. 4, 2018, 7 Pages.

"Extended Search Report Issued in European Patent Application No. 20173565.1", dated Jul. 16, 2020, 8 Pages.

"Non Final Office Action Issued in U.S. Appl. No. 16/242,926", dated Sep. 6, 2019, 13 Pages.

"International Search Report and Written Opinion Issued in PCT Application No. PCT/US2018/024232", dated Jun. 15, 2018, 11 Pages.

"International Preliminary Report on Patentability Issued in PCT Application No. PCT/US2014/042023", dated May 22, 2015, 7 Pages.

"First Office Action and Search Report Issued in Chinese Patent Application No. 201880023232.5", dated Nov. 4, 2020, 10 Pages.

\* cited by examiner

RADIO FREQUENCY (RF) POWER BACK-OFF OPTIMIZATION FOR SPECIFIC ABSORPTION RATE (SAR) COMPLIANCE

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on. Modern mobile computing devices may incorporate multiple antennas to support various wireless subsystems and communications. The multiple antennas may include for example one or more cellular, Wi-Fi, Bluetooth, global navigation satellite system (GNSS), and/or near field communication (NFC) antennas.

One challenge faced by mobile computing device designers is adherence to regulatory requirements that are imposed by entities such as the Federal Communication Commission (FCC), the European Union (EU), and so forth. An example of such regulatory requirements is legal limits on Specific Absorption Rate (SAR) that are established in relation to radio frequency (RF) energy associated with the various wireless and communications subsystems of a mobile computing device. A traditional solution for achieving compliance with SAR limits involves setting a fixed maximum RF transmit power for communication hardware (e.g., radios) to a power level that maintains legal compliance in the presence of a user. However, placing such a fixed maximum on the transmit power underutilizes the capabilities of communication hardware and may adversely affect communication connections and/or quality. Thus, traditional techniques for SAR compliance may be inadequate for some device configurations and use scenarios.

SUMMARY

Radio Frequency (RF) power back-off optimization techniques are described for intelligently modifying the performance of radio devices to maintain specific absorption rate (SAR) compliance with regulatory requirements while minimally perturbing antennas/radio operations. In one or more implementations, a mobile computing device is configured to implement a SAR optimization scheme to maintain compliance. Rather than setting a fixed back-off for power reductions, one or more user presence detectors may be employed along with information obtained regarding signal conditions to determine when humans are potentially at risk from SAR exposure and selectively apply variable adjustments to RF power (e.g., "back-offs") that vary based on user presence and signal conditions. The mobile computing device may also be configured to report SAR conditions and/or mitigation actions to a base station to enable the base station to manage a connection to services based at least in part upon knowledge of SAR actions taken by the mobile computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

One challenge faced by mobile computing device designers is adherence to Specific Absorption Rate (SAR) limits that are established in relation to radio frequency (RF) emissions by mobile devices. A traditional solution involves setting a fixed maximum RF transmit power across all communication hardware, however, this approach generally sets a cautiously low maximum to maintain compliance at the expense of communication connection performance and/or quality.

Radio Frequency (RF) power back-off optimization techniques are described for specific absorption rate (SAR) compliance. In one or more implementations, a mobile computing device is configured to implement a SAR optimization scheme to maintain SAR compliance. Rather than setting a fixed back-off that is merely turned on and off in response to a triggering event, one or more user presence detectors may be employed along with information obtained regarding current signal conditions to determine when humans are potentially at risk from SAR exposure and selectively apply variable adjustments to RF power (e.g., "back-offs") that may vary based on user presence and signal conditions. The mobile computing device may also be configured to report SAR conditions and/or mitigation actions to a base station to enable the base station to manage a connection to services based at least in part upon knowledge of SAR actions taken by the mobile computing device.

In the following discussion, an example environment and devices are first described that may employ the techniques described herein. Example details and procedures are then described which may occur in the example environment and by the devices as well as in other environments and by other devices. Consequently, the example details and procedures are not limited to the example environment/devices and the example environment/devices are not limited to performance of the example details and procedures.

Example Operating Environment

Figure 1:
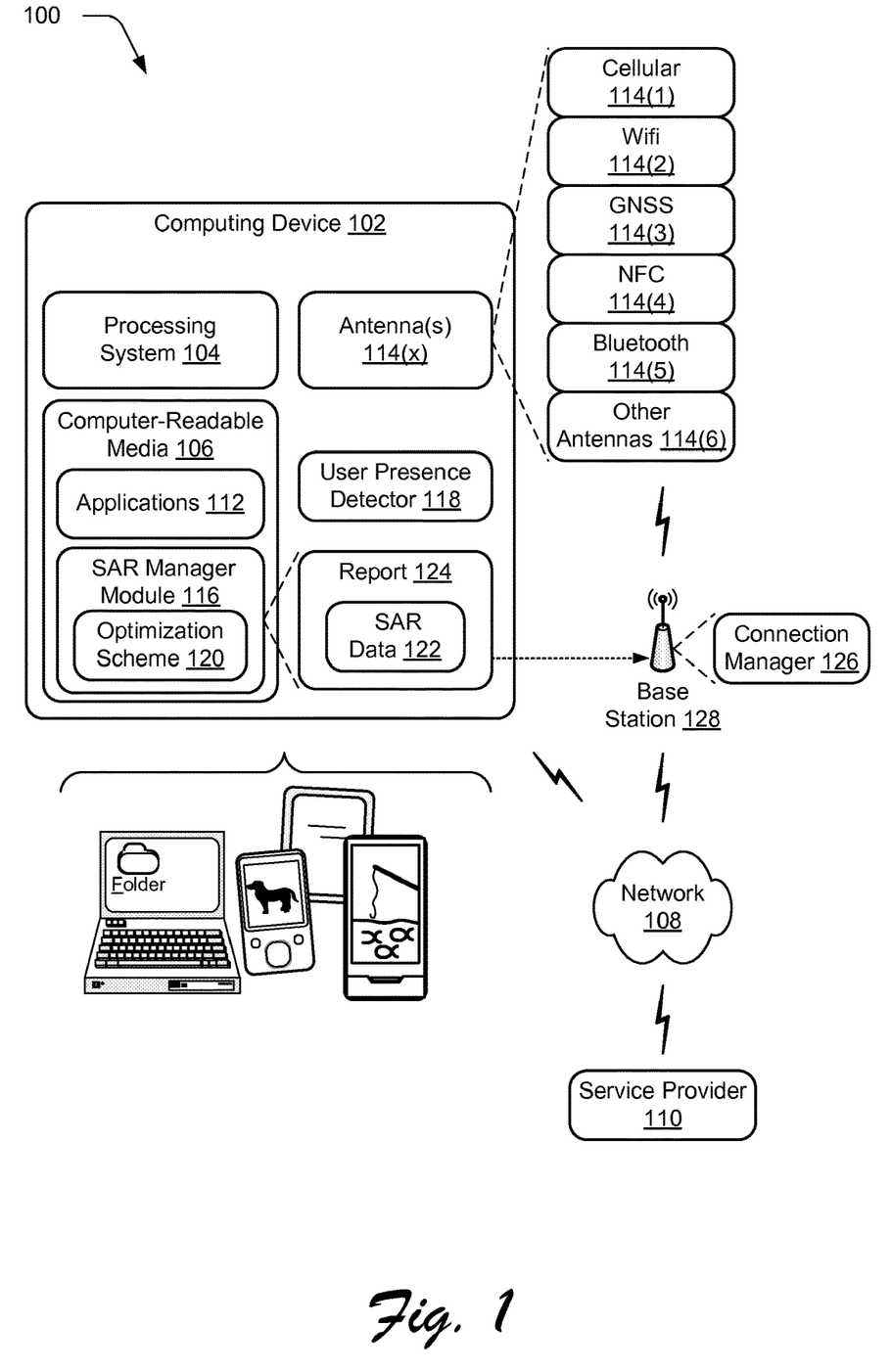
FIG. 1 is an illustration of an environment in an example implementation that is operable to employ the techniques described herein.

FIG. 1 is an illustration of an environment 100 in an example implementation that is operable to employ the techniques described herein. The illustrated environment 100 includes an example of a computing device 102 that includes a processing system 104 and computer-readable media 106 that are representative of various different types and combinations of processing components, media, memory, and storage components and/or devices that may be associated with a computing device and employed to provide a wide range of device functionality. In at least some embodiments, the processing system 104 and computer-readable media 106 represent processing power and memory/storage that may be employed for general purpose computing operations. More generally, the computing device 102 may be configured as any suitable computing system and/or device that employ various processing systems and computer-readable media to implement functionality described herein, additional details and examples of which are discussed in relation to the example computing system of FIG. 5.

The computing device 102 may be configured in a variety of ways. For example, the computing device 102 may be configured as a mobile computing device for mobile use as illustrated, such as a mobile phone, a tablet computer, a laptop, a portable media device, and so on. The computing device 102 may range from full resource devices with substantial memory and processor resources to a low-resource device with limited memory and/or processing resources. The computing device 102 may also relate to software that causes the computing device 102 to perform one or more operations.

The computing device 102 may further be communicatively coupled over a network 108 to a service provider 110. The service provider 110 may be configured to make various resources (e.g. content and services) available over the network 108 to the computing device 102 and other clients. Generally, resources made accessible by a service provider 110 may include any suitable combination of services and/or content typically made available over a network by one or more providers. Some examples of services include, but are not limited to, cellular communication service, Internet data service, navigation service, a search service, an email service, an instant messaging service, an online productivity suite, and an authentication service to control access of clients to the resources, to name a few examples. Content may include various combinations of text, multi-media streams, documents, application files, photos, audio/video files animations, images, web pages, web applications, device applications, content for display by a browser or other client application, and the like.

As further illustrated in FIG. 1 the computing device 102 may include various applications 112, one or more antennas 114(x) to provide various wireless communication functionality, a SAR manager module 116 operable to control the antennas for SAR compliance, and one or more user presence detectors 118 to supply user presence indications with respect to the antennas. A variety of applications 112 that provide different functionality to the device may be provided on some form of computer-readable media and may be executed via the processing system. Some examples of applications 112 typically associated with computing devices include, but are not limited to, an operating system, a productivity suite that integrates multiple office productivity modules, a web browser, games, a multi-media player, a word processor, a spreadsheet program, a photo manager, and so forth.

The one or more antennas 114(x) are representative of various antennas employed by the computing device to implement wireless functionality, subsystems, and communications. In accordance with techniques described herein, the antennas may include multiple different kinds of antennas (e.g., radios) that are arranged together within one or more antennas zones established for the computing device. In general, the antennas may be placed to minimize interference between antennas and/or achieve performance objectives for the suite of antennas as a whole. A variety of different types of antennas, combinations of different types of antennas, and arrangements of antennas are contemplated. For example, the antennas 114(x) may include one or more cellular 114(1) antennas, Wi-Fi 114(2) antennas, global navigation satellite system (GNSS) 114(3) antennas, Near Field Communication (NFC) 114(4) antennas, Bluetooth 114(5) antennas, and/or other 114(6) antennas. In accordance with techniques described herein, the antennas 114 may include multiple antennas that may be interdependent upon one another and/or are arranged/designed in combination. In some scenarios, some wireless technologies may be implemented using two or more individual radios/antennas.

For instance, the Wi-Fi 114(2) antennas may employ a two-by-two multiple input/multiple output configuration (e.g., 2×2 MIMO). The Wi-Fi antennas may include at least a main and a MIMO antenna in some configurations. In addition, a Bluetooth 114(5) antenna may optionally be combined with the Wi-Fi 114(2) antennas. Further, modern cellular technologies such as Long Term Evolution (LTE), WiMax, and/or 4G may employ two or more cellular 114(1) antennas, such as a main cellular antenna and a MIMO cellular antenna and cover various frequencies, geographic areas, and so forth. The GNSS 114(3) antennas may be configured for use with various types of navigation standards, technologies, and systems including but not limited to GPS, GLONASS, Galileo, and/or BeiDou navigation systems, to name some examples.

The SAR manager module 116 represents functionality operable to implement an optimization scheme 120 to control antennas 114(x) to maintain SAR compliance in various scenarios. The SAR manager module 116 may be implemented as a standalone module, as firmware of one or more antennas/communication subsystems, as a component of an operating system or other application 112 (e.g., an antenna performance and communication manager application), and so forth. In accordance with techniques described herein, the optimization scheme 120 is configured to select and apply variable back-offs that may be determined based upon a plurality of considerations. For example, a variable amount of RF transmission power reduction may be selected in response to a trigger based upon a user presence indication in combination with signal conditions that are determined for a device. The amount of power reduction applied may be selected from a range of multiple options that are dependent at least partially upon ascertained signal conditions, rather than merely user presence alone. As discussed in more detail in relation to the following figures, signal conditions may include but are not limited to current RF transmission power levels measured via suitable hardware (e.g., sensors, circuitry, etc.) and/or predicted future conditions determined using a prediction model established for a device. The multiple options for may include options to apply a reduction at different levels, maintain a current level, and/or delay a reduction in different scenarios in accordance with signal conditions. Under some detected conditions indicative of low or non-existent potential for SAR exposure, RF transmission power may even be boosted to a higher levels to improve performance/quality. This is in contrast to traditional techniques that employ fixed back-offs at pre-set levels that are either turned on or off in a binary manner when triggered by user presence or otherwise.

To control antenna operations, the SAR manager module 116 may be configured to obtain user presence indications from user presence detectors 118. The user presence detectors 118 are representative of suitable hardware, software, firmware, logic and combinations thereof to obtain user presence indications and to supply such information for use by the SAR manager module 116. A variety of different physical sensors, sensor arrangements, and techniques for the user presence detectors 118 may be employed.

For example, a user presence detector 118 may be configured as a hardware sensor capable of detecting and indicating presence of a user relative to the computing device and/or relative to particular regions of the device for which SAR mitigation is relevant. Generally, a user presence detector 118 may be located proximate to antennas 114(x) to indicate when a user is positioned in a manner relative to the antennas that would increase or decrease the likelihood of exceeding SAR limits. For instance, placing a hand over a region having one or more of the antennas to hold a device may increase the amount of RF energy that the user is exposed to. On the other hand, some device hand positions for holding a device may be at a sufficient distance from the antennas to reduce exposure and permit higher RF energy outputs without causing SAR violations. Further, SAR compliance may depend in general upon whether or not a user is physically interacting with the device and the context of interaction.

Thus, if the device is set down to watch a media presentation or placed on a table after use, the level of potential exposure decreases. User actions with a device such as typing, gestures, selecting buttons, and other types of input may be indicative of user presence. These and other contextual factors regarding usage of the device may be considered along with information obtained directly from user presence detectors 118 to determine when and how to trigger and adjust antenna output. By way of example, user presence detectors 118 employed by a device may include but are not limited to capacitive sensors, infrared radiation (IR) sensors, pressure sensors, optical detectors, a camera, sensors for measuring reflected RF radiation from the antennas 114(x), and/or other type of sensors capable of determining a relationship of a user relative to the device and supplying such information as user presence indications.

In addition to implementing the optimization scheme 120 to control antennas and mitigate SAR exposure, the SAR manager module 116 may be further configured to initiate reporting of data describing SAR related conditions and actions to other entities to facilitate management of connections of the device to access services associated with one or more service providers 110. To do so, the SAR manager module 116 may generate SAR data 122 in a suitable format for inclusion in a report 124 for communication to a connection manager 126.

The connection manager 126 represents functionality operable to facilitate management of connections of the computing device 102 via the antennas 114(x) to corresponding services and service providers. This may include but is not limited to opening/closing connections, client authentication, providing access to data and resources, setting data rates, controlling communication quality, handling hand-offs between access points, routing operations, and so forth. In at least some implementations, the connection manager 126 is configured to utilize SAR data 122 supplied in reports 124 from devices to manage connections of the devices in a manner that takes SAR related conditions and activities of the devices into account. In other words, connection management operations performed by the connection manager 126 may be informed by and/or selected in dependence upon SAR data 122 supplied by devices. The connection manager 126 may be implemented a component of a base station 128 associated with a cellular network, Wi-Fi network, a satellite network, or other network as represented in FIG. 1. The base station 128 is therefore representative of any suitable wireless network access point through which antennas 114(x) may gain access to corresponding services, such as a cellular tower/cellular base station, a Wi-Fi access point, a wireless router, a satellite network satellite, or other base station device.

Having discussed an example environment and devices, consider now some example details regarding RF power back-off optimization for SAR compliance in accordance with various implementations.

RF Power Back-Off Optimization Details

The following discussion presents some details regarding RF power back-off optimization for SAR compliance in relation to some illustrative procedures. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. Aspects of the described procedures may be implemented by one or more suitably configured computing devices individually or in combination, such as a computing device 102 of FIG. 1 that includes a SAR manager module 116 and/or a base station 128 device that implements a connection manager 126.

Figure 2:
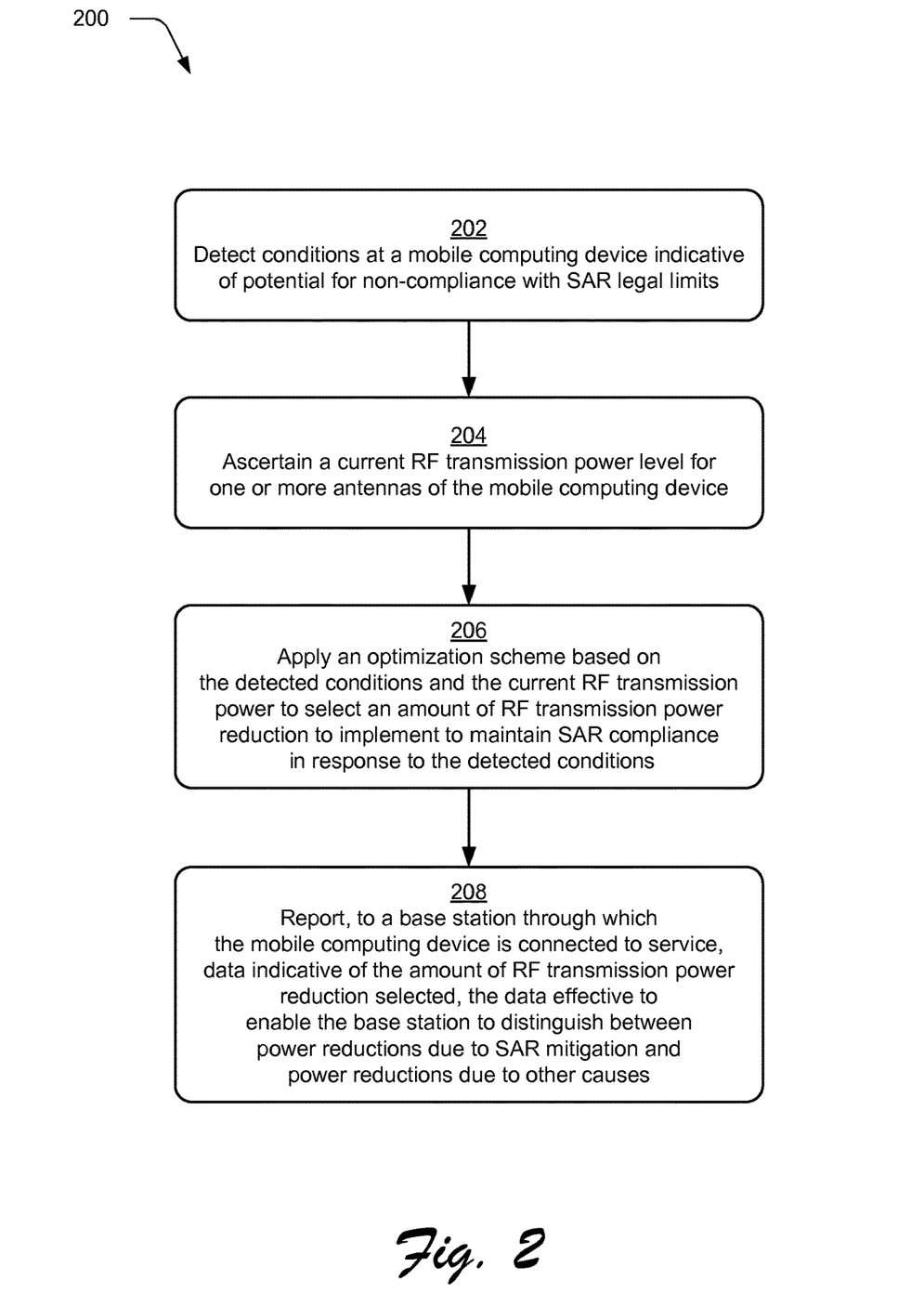
FIG. 2 is a flow diagram that describes an example procedure in which antennas are controlled in dependence upon SAR conditions and a current transmission power level.

FIG. 2 depicts an example procedure 200 procedure in which antennas are controlled in dependence upon SAR conditions and a current transmission power level. Conditions are detected at a mobile computing device that are indicative of potential for non-compliance with specific absorption rate (SAR) legal limits (block 202). The detected conditions may include indications of user presence with respect to one or more antennas 114(x). The indications of user presence may be determined using information from one or more user presence detectors 118. Generally, user presence detectors 118 may be placed within or proximate to a portion of a device that houses antennas and/or in relation to individual antennas to detect when a user is "present." The presence of a user in the context of SAR mitigation refers to whether the relationship of the user to a device encroaches upon the antennas to an extent that potential for the user to be exposed to RF emissions above SAR limits is increased to an unacceptable level. A user may be considered present under conditions that increase potential exposure to unacceptable levels and considered not present when the user is sufficiently removed from the antennas. Presence may be indicated for different antennas or groups of antennas of a device on an individual basis. Thus, a user may be considered present with respect to some antennas and at the same time considered not present with respect to other antennas of a particular device.

In addition or alternatively, other conditions may also be detected that provide contextual clues regarding whether or not a user is at risk for excessive SAR exposure. Presence with respect to SAR compliance may depend in general upon whether or not a user is physically interacting with the device and the context of interaction. Thus, if the device is set down to watch a media presentation or placed on a table after use, the level of potential exposure decreases. User actions with a device such as typing, gestures, selecting buttons, and other types of input may also be indicative of user presence. Additionally, future conditions and user activities that are predicted using a prediction model as described below may also be considered. These and other contextual factors regarding usage of the device may be detected as conditions used along with information obtained directly from user presence detectors 118 to determine when and how to adjust antenna output.

In accordance with techniques discussed herein the user presence indications and other conditions indicative of potential for non-compliance with specific absorption rate (SAR) legal limits may operate as triggering events that initiate a SAR analysis by the SAR manager module 116. Rather than using such triggers as a singular basis for initiating SAR mitigation, the triggers may be used as one of multiple factors considered in making decisions regarding actions for SAR mitigation. Further, variable rather the pre-determined fixed back-off may be applied. For example, various signal and communication connection conditions associated with a device may be taken into account for RF transmission power control. By so doing, the SAR manager module 116 may be configured to selectively apply variable adjustments to RF power (e.g., "back-offs") that may vary based on user presence and signal conditions.

In particular, a current radio frequency transmission power level is ascertained for one or more antennas of the mobile computing device (block 204). Then, an optimization scheme is applied based on the detected conditions and the current RF transmission power to select an amount of RF transmission power reduction to implement to maintain SAR compliance in response to the detected conditions (block 206). For instance, the current radio frequency transmission power may be monitored in various ways and employed to inform an optimization scheme 120 implemented by the SAR manager module 116. In one approach, transmission power may be measured via power monitoring circuitry incorporated with hardware of particular radios/antennas. In addition or alternatively, a computing device 102 may be configured to include a monitoring device having a power detector circuit designed to monitor RF levels of one or more corresponding antennas. Measurement of actual, current transmission conditions enables the system to determine with precision the potential that exists for non-compliance with SAR limits. For instance, when a device is relatively close to base station, transmission power may be low and the risk for SAR exposure may be correspondingly low as well. In this case, there may be no cause for applying a RF back-off even though a user is present. Thus, the current power level may be maintained. On the other hand, transmission power and SAR exposure may increase in other scenarios, in which case an appropriate RF back-off may be selected and applied based on the current power level.

Thus, the optimization scheme 120 may operate to selectively apply variable RF transmission power reductions based on the detected conditions and the current RF transmission power. Such RF "back-offs" that are applied may vary based upon the ascertained power level and/or other signal conditions. The decision regarding whether or not to apply a back-off is also based upon indications of user presence and other conditions that may trigger SAR analysis. Detection of certain conditions and/or combinations of conditions may trigger control actions to adapt antenna operations for compliance. This may occur when detected conditions are indicative of potential to exceed SAR legal limits. On the other hand, some conditions have no substantial impact on SAR compliance in which case antennas may be controlled to optimize performance. For instance, a current transmission power level may be maintained when the power level is sufficiently low to avoid exceeding SAR legal limits. Further, a back-off may be delayed in circumstances in which detected conditions indicate an expected change in signal strength that will avoid exceeding SAR legal limits is already forthcoming.

Accordingly, the optimization scheme 120 implemented by the SAR manager module 116 may operate to modify transmission power levels and/or other operational parameters for one or more antennas device in dependence upon detected SAR conditions and signal conditions. This may include reducing transmission power levels for SAR compliance in response to detection of some conditions and boosting transmission power levels for performance in response to detection of some other conditions. Moreover, different antennas may be controlled individually based on the accessory arrangement such that for a given arrangement one or more selected antennas having the potential to cause excessive SAR conditions may be controlled for compliance (e.g., reduce energy output/power level) while in the same arrangement other antennas (e.g., antennas that do not contribute to excess SAR conditions) may continue to operate "normally" and/or may be boosted for performance.

In an implementation, back-offs are implemented in a gradual manner, such as by using multiple steps or stages to ramp down the transmission power a selected amount over a period of time. Power may also be ramped back up in similar manner in appropriate circumstances. By ramping down and up in this manner, as opposed to taking large singular jumps, the system has additional time to prepare for changes that are applied. This may assist in avoiding both sudden SAR spikes and overly aggressive handoffs or dropped connections due to SAR mitigation actions. The approach also gives additional time to a connection manager 126 and/or base station 128 to determine how to respond to SAR mitigation actions that are taken by clients.

Data indicative of the amount of RF transmission power reduction selected is reported to a base station through which the mobile computing device is connected to service (block 208). As mentioned, the SAR manager module 116 may be configured to initiate reporting of data describing SAR related conditions and actions to other entities in addition to implementing the optimization scheme 120. For instance, the SAR manager module 116 may be configured to include SAR data 122 in a report 124 to a base station 128. The SAR data 122 is effective to enable the base station to distinguish between power reductions due to SAR mitigation and power reductions that may be due to other causes, which may include but are not limited device location, base station coverage and layout, network conditions, and/or signal obstruction zones, to name a few examples. The base station may employ information regarding SAR mitigations and/or back-off actions taken by a device to manage one or more connections for the device accordingly, additional details of which may be found in relation the following example procedure.

Figure 3:
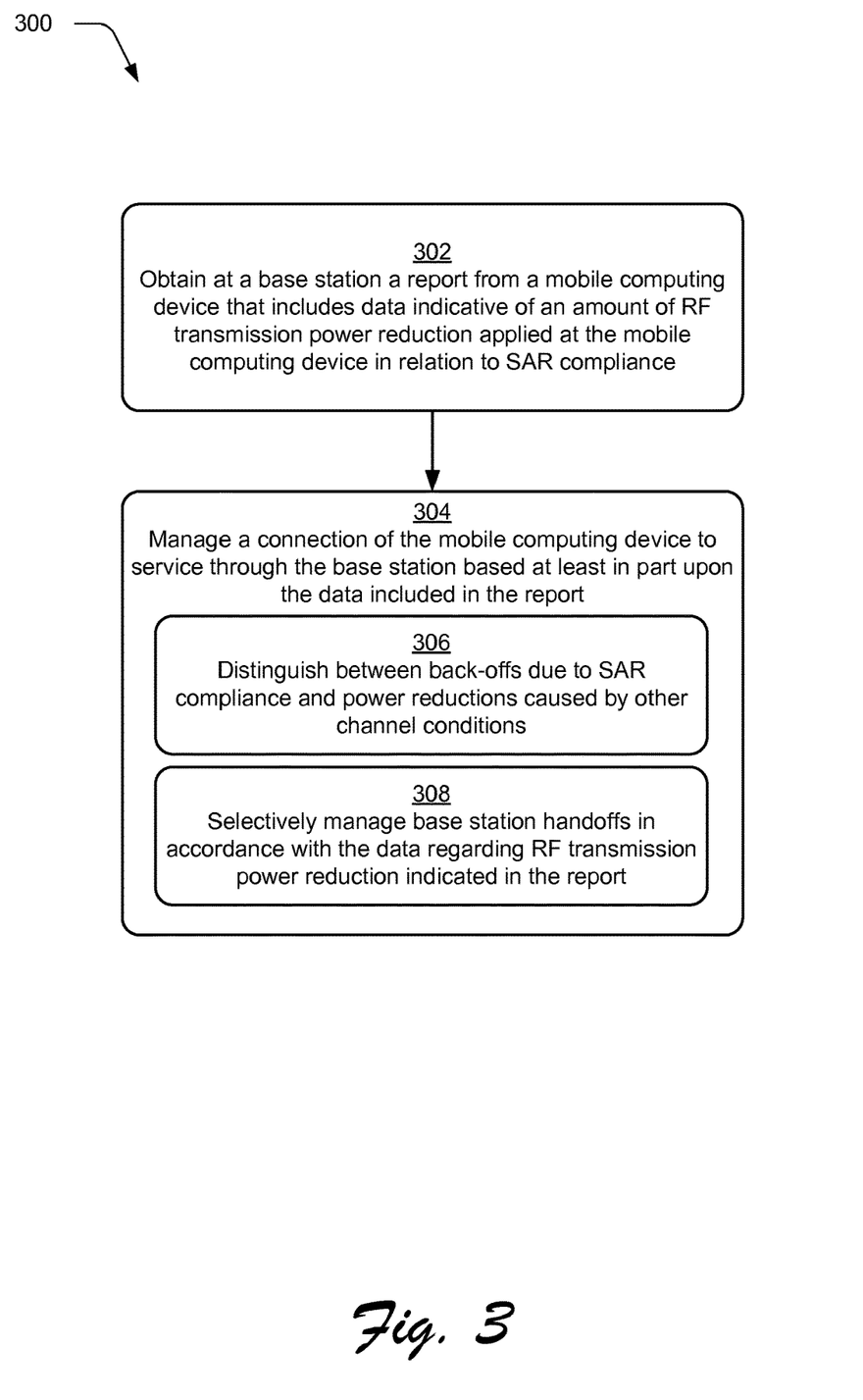
FIG. 3 is a flow diagram that describes an example procedure in which a base station manages connections to service based in part upon reported SAR conditions.

FIG. 3 is a flow diagram that describes an example procedure 300 in which a base station manages connections to services based in part upon reported SAR conditions. A report from a mobile computing device is obtained at a base station that includes data indicative of an amount of RF transmission power reduction applied at the mobile computing device in relation to SAR compliance (block 302). For instance, a report 124 having SAR data 122 may be obtained at a base station 128 from a computing device 102. The report may be received and processed by way of a connection manager 126 or comparable functionality. The report may be also configured in various ways. In one approach, the SAR data 122 is included in an existing measurement report exchanged between a device and base station, such as a measurement report typically sent by a mobile phone to a cellular tower in a cellular communication network. The report may also be a dedicated report, message, or other suitable notification generated by a SAR manager module 116 to provide the SAR data 122. The SAR data 122 may include information regarding SAR conditions and/or signal conditions observed by the device and actions taken with respect to SAR mitigation. In instances in which a back-off is applied at the device, the SAR data 122 may indicate the amount of back-off. The report may further include indications regarding signal coverage and strength that may be used by the base station for processing of hand-offs between base stations/access points.

A connection of the mobile computing device to service through the base station is managed based at least in part upon the data included in the report (block 304). For instance, a connection manager 126 associated with services from a service provider 110 and/or a corresponding base station 128 may operate to manage connections of mobile computing devices to access services. The connection manager 126 may further be configured to receive and process reports 124 from the mobile devices that contain SAR data 122 as described herein.

The connection manager 126 may perform various operations to manage connections in dependence upon the SAR data 122 contained in the reports. This may include operations to distinguish between back-offs due to SAR compliance and power reductions caused by other channel conditions (block 306) and operations to selectively manage base station handoffs in accordance with the data regarding RF transmission power reduction indicated in the report (block 308). Thus, the SAR data 122 assists the connection manager 126 of a base station 128 in understanding the cause of observed channel conditions and determining how to react to manage connections accordingly. In one example, the connection manager may determine how to handle hand-offs between base stations based upon the understanding of SAR conditions and signal conditions at a device. For instance, the connection manager may determine based on provided SAR data that a transmission drop off is due to SAR mitigation rather that other channel conditions, such as movement of the device between locations, obstructions, and so forth. In this case, a hand-off to another base station may be prevented or delayed until the SAR concern is resolved. In another scenario, the connection manager may proceed with a hand-off in response to determining that the cause of poor signal and channel conditions is due to movement/relocation of a mobile device and that another base station is available that may improve the connection and/or service quality. In a further example, the connection manager may force a hand-off to occur to assist in mitigating SAR. This may occur for example in a situation in which base station coverage overlaps and the forced switch enables the device to drop down to a lower transmission power level based on proximity of the device to the target base station.

Additionally, the connection manager 126 may identify situations in which a channel drop is imminent based on the SAR data. Anticipation of channel drops in this manner may enable the base station and device to handle the drop gracefully. For example, the connection manager 126 may attempt to hand-off to another base station with potentially better signal conditions, cause an alert regarding the drop to be communicated, or otherwise take action to minimize the impact of the channel drop. Various other examples are also contemplated. Thus, a base station may utilize knowledge of SAR actions and conditions obtained from devices to manage connections of the devices in various ways including but not limited to the example management scenarios just described.

Figure 4:
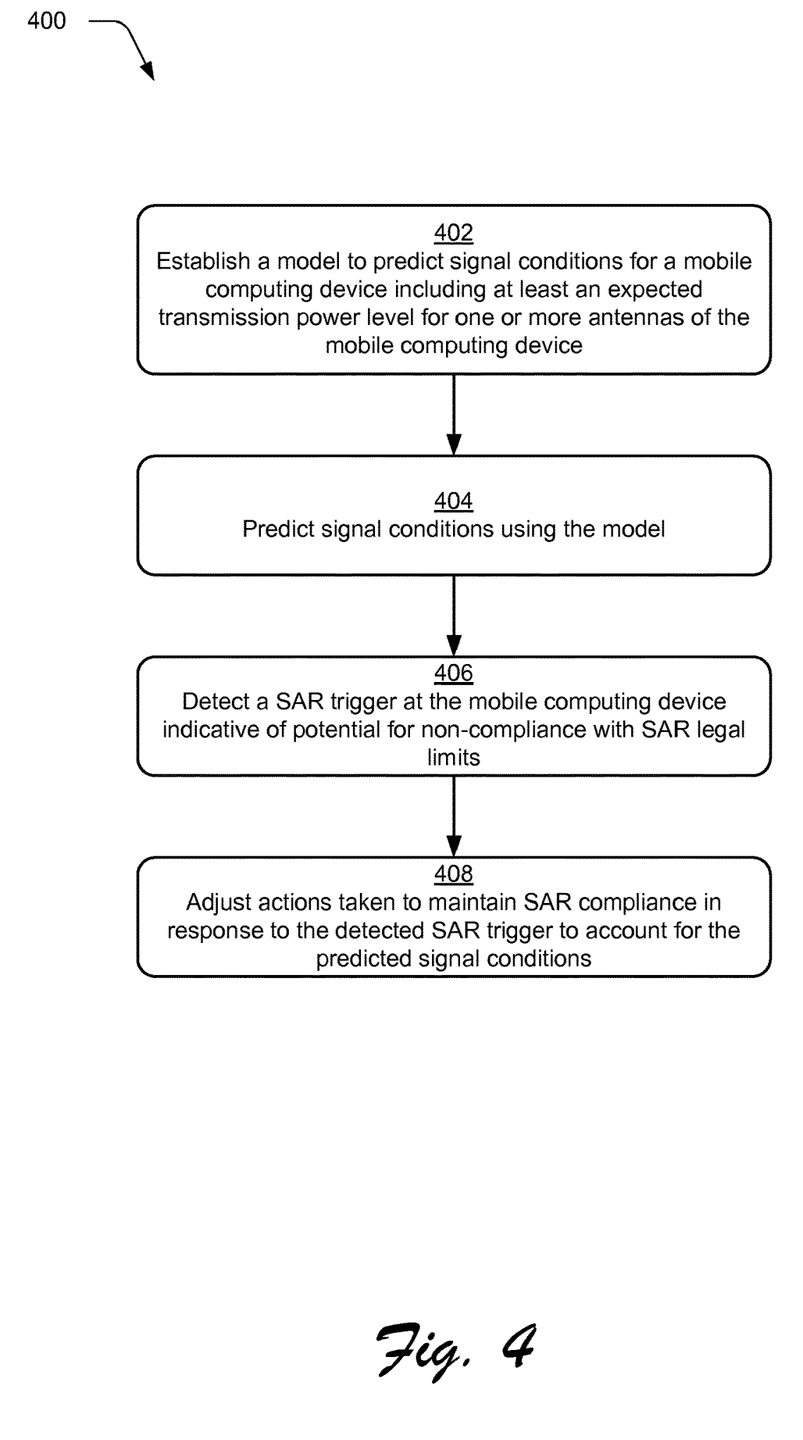
FIG. 4 is a flow diagram that describes an example procedure in which a prediction model is established and applied to SAR mitigation based on expected signal conditions predicted via the model.

FIG. 4 is a flow diagram that describes an example procedure 400 in which a prediction model is established and applied for SAR mitigation based on expected signal conditions predicted via the model. A model is established to predict signal conditions for a mobile computing device including at least an expected transmission power level for one or more antennas of the mobile computing device (block 402) and signal conditions are predicted using the model (block 404). For example, the SAR manager module 116 may be configured to include and make use of a prediction model that may be used along with measured and detected conditions to drive SAR mitigation analysis and actions. The prediction model may be configured in various ways to provide predictions of expected signal conditions. The predictions of expected signal conditions may be employed in connection with other techniques described herein, such as in conjunction with the power back-off optimization techniques discussed in relation to the example procedures of FIGS. 2 and 3. For instance, signal conditions used to drive an optimization scheme 120 may include an expected transmission power level predicted for one or more antennas using a prediction model established for the mobile computing device.

In one approach, the prediction model is configured to derive prediction for a signal strength measurement such as a received signal strength indicator (RSSI). The model may designed to account for a plurality of factors to generate predictions for an expected transmission power level of a particular antenna at a given time. For instance, the model may account for one or more of historical analysis of connection traffic, usage and travel patterns for individual devices, network topology, base station arrangement and coverage grids, information regarding coverage overlaps, historic bandwidth metrics, device and base station capabilities, and/or other factors that facilitate predictions of expected changes in transmission power based on signal conditions within the network. Statistical analysis and/or weighted combinations of these and other factors may be used to create a model that indicates when changes to transmission power are likely to occur and the amount of drop or increase expected. Predictions derived via the model may then be used to inform decisions regarding whether to take action in response to a SAR triggering event and what action to take.

In particular, a SAR trigger is detected at the mobile computing device that is indicative of potential for non-compliance with SAR legal limits (block 406) and actions taken to maintain SAR compliance are adjusted in response to the detected SAR trigger to account for the predicted signal conditions (block 408). The SAR manager module 116 may be configured to utilize predicted signal conditions in various ways. For example, the SAR manager module 116 may operate to effectuate techniques for SAR mitigation with RF back-off optimization described herein in response to a trigger, such as detection of user presence. Generally speaking, control actions to take with respect to one or more antennas may be specified or computed in relation to different conditions. By way of example and not limitation, antenna control actions may include but are not limited to setting transmission power limits, throttling of one or more antennas or types of antennas, prioritization of antenna communications, and power back-off adjustments, as well as intentional radio degradation and/or radiation pattern modifications achieved through programmable elements (e.g., counter-measure devices), to name a few examples. One or more control actions to mitigate potential for exceeding legal SAR limits may be potentially applied for antennas that contribute to SAR emissions.

Such potential actions to take may be derived based upon actual, current SAR conditions. However, in at least some cases identified actions may be adjusted based upon predicted conditions ascertained via the prediction model. For instance, the prediction model may indicate an expected reduction in transmission power for a mobile device as the mobile device is transported/relocated closer to a base station, such as when a user of the device travels along a route to work on a daily basis. In this example, historic usage data for the device/user along the route may be employed to predict a future reduction in transmission power. In this case, a back-off triggered based on SAR concerns may be delayed or foregone since a reduction is already expected. On the other hand, a predicted increase in transmission power may be used as a basis to effectuate a SAR back-off or take other mitigation action, such as forcing a hand-off, outputting a notice of the expected change, or otherwise adjusting the SAR related activities based on the predictions. In this manner, a prediction model may be employed to produce predictions of expected signal conditions that may be used as at least one consideration for optimization of RF power back-offs using an optimization scheme as detailed herein.

Having considered the foregoing example procedures, consider now a discussion of example systems and devices that may be employed to implement aspects of techniques in one or more embodiments.

Example System and Device

Figure 5:
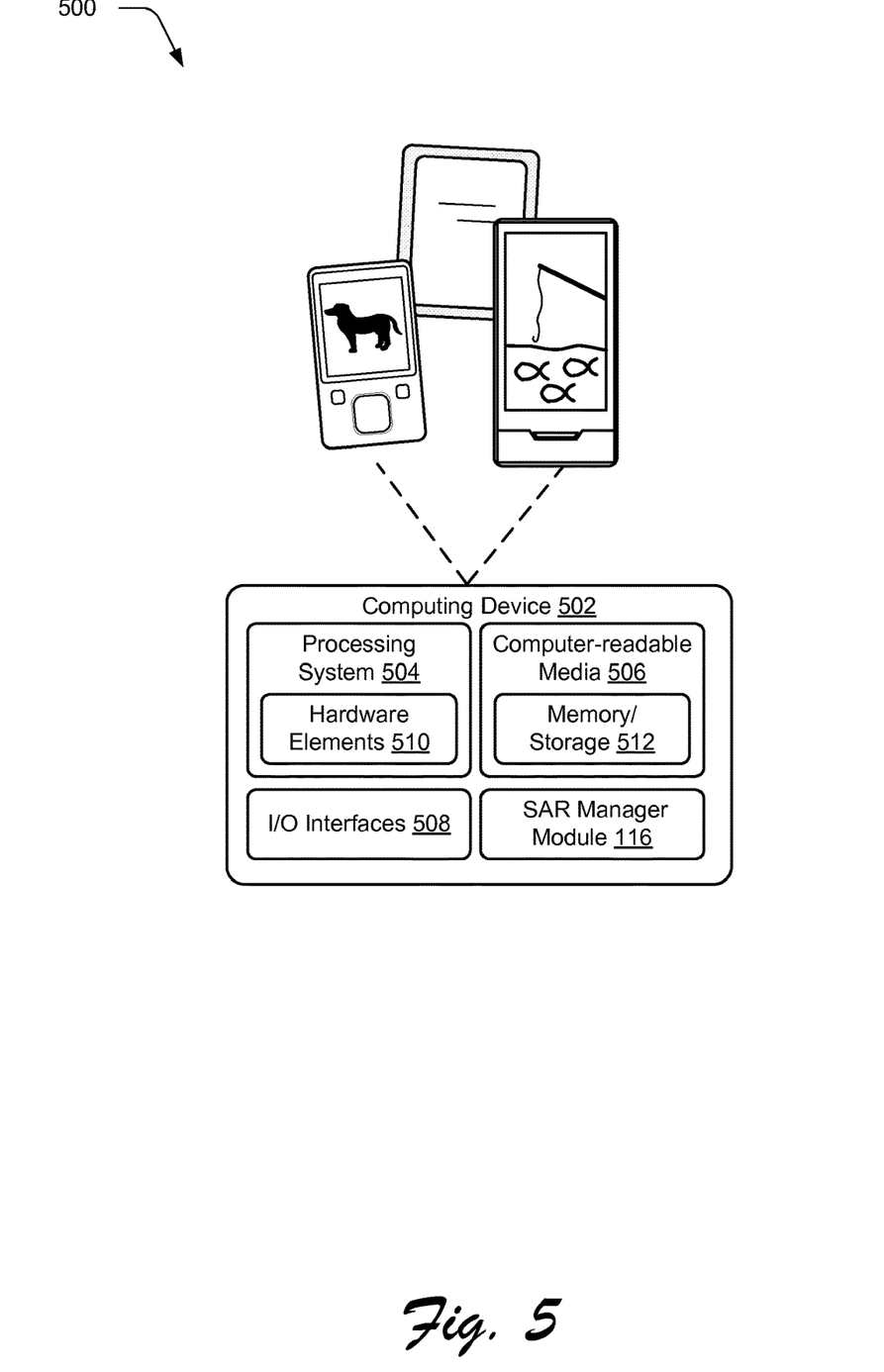
FIG. 5 illustrates an example system including various components of an example device that can be implemented as any type of computing device as described with reference to FIGS. 1-4 to implement techniques described herein.

FIG. 5 illustrates an example system generally at 500 that includes an example computing device 502 that is representative of one or more computing systems and/or devices that may implement the various techniques described herein. The computing device 502 may, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 502 as illustrated includes a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the modules and techniques described herein, including but not limited to the SAR manager module 116 (as shown) and connection manager 126, may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" may refer to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, microcontroller devices, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable media described previously.

Combinations of the foregoing may also be employed to implement various techniques described herein. Accordingly, software, hardware, or executable modules may be implemented as one or more instructions and/or logic embodied on some form of computer-readable media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable media and/or hardware elements 510 of the processing system 504. The instructions and/or functions may be executable/operable by one or more articles of manufacture (for example, one or more computing devices 502 and/or processing systems 504) to implement techniques, modules, and examples described herein.

CONCLUSION

Although the example implementations have been described in language specific to structural features and/or methodological acts, it is to be understood that the implementations defined in the appended claims are not necessarily limited to the specific features or acts described. Rather, the specific features and acts are disclosed as example forms of implementing the claimed features.

What is claimed is:

1. A method comprising:
   detecting a specific absorption rate (SAR) trigger at a mobile computing device indicative of potential for non-compliance with SAR legal limits;
   determining current signal conditions of the mobile computing device, the current signal conditions including a current radio-frequency (RF) transmission power of one or more antennas of the mobile computing device for communicating with one or more base stations;
   predicting future signal conditions of the mobile computing device using a prediction model, the prediction model including a predicted RF transmission power for maintaining the communication of the one or more antennas of the mobile computing device with the one or more base stations over a future period of time and for satisfying the SAR legal limits over the future period of time, the prediction model configured to derive a predicted change over the future period of time in a received signal strength indicator (RSSI) detectable at the one or more base stations based on analysis of historical usage data for the mobile computing device; and
   adjusting the RF transmission power of the one or more antennas of the mobile computing device a selected amount in response to detecting the SAR trigger, the selected amount based on the determined current signal conditions and the predicted future signal conditions.

2. A method as described in claim 1, further comprising reporting data indicative of the selected amount of adjustment of the RF transmission power to a base station of the one or more base stations through which the mobile computing device is connected to service.

3. A method as described in claim 2, wherein the data indicative of the selected amount of adjustment of the RF transmission power is included in a measurement report sent to a base station of the one or more base stations and effective to enable the base station to distinguish between power adjustments due to SAR mitigation and power adjustments due to other causes.

4. A method as described in claim 1, wherein the selected amount of adjustment of the RF transmission power varies based upon the current RF transmission power.

5. A method as described in claim 1, wherein adjusting the RF transmission power of the one or more antennas of the mobile computing device the selected amount comprises reducing the RF transmission power a variable amount when the predicted future signal conditions and the current RF transmission power are indicative of a potential to exceed the SAR legal limits.

6. A method as described in claim 1, wherein adjusting the RF transmission power of the one or more antennas of the mobile computing device the selected amount comprises maintaining the current RF transmission power when the current RF transmission power is sufficiently low to avoid exceeding the SAR legal limits.

7. A method as described in claim 1, wherein adjusting the RF transmission power of the one or more antennas of the mobile computing device the selected amount comprises delaying a reduction of the RF transmission power when the predicted future signal conditions indicate that a change in signal strength is expected that will avoid exceeding the SAR legal limits.

8. A method as described in claim 1, wherein detecting the SAR trigger comprises recognizing whether or not a user is present with respect to the one or more antennas via one or more user presence detectors provided with the mobile computing device.

9. A method as described in claim 8, wherein the user presence detectors comprise one or more of a capacitive sensor, a pressure sensor, a camera, an optical sensor, or an infrared radiation (IR) sensor.

10. A method as described in claim 1, wherein the one or more antennas include at least a pair of cellular antennas for cellular communications.

11. The method of claim 1 wherein the prediction model accounts for one or more of historical analysis of connection traffic, usage and travel patterns for individual devices, network topology, base station arrangement and coverage grids, information regarding coverage overlaps, historical bandwidth metrics, and base station capabilities.

12. A mobile computing device comprising:
one or more antennas configured to provide wireless communication functionality;
one or more hardware elements configured to implement a specific absorption rate manager module operable to:
detect a specific absorption rate (SAR) trigger at the mobile computing device indicative of potential for non-compliance with SAR legal limits;
determine current signal conditions of the mobile computing device the current signal conditions including a current radio-frequency (RF) transmission power of one or more antennas of the mobile computing device for communicating with one or more base stations;
predict future signal conditions of the mobile computing device using a prediction model, the prediction model including a predicted RF transmission power for maintaining the communication of the one or more antennas of the mobile computing device with the one or more base stations over a future period of time and for satisfying the SAR legal limits over the future period of time, the prediction model configured to derive a predicted change over the future period of time in a received signal strength indicator (RSSI) detectable at the one or more base stations based on analysis of historical usage data for the mobile computing device; and
adjust the RF transmission power of the one or more antennas of the mobile computing device a selected amount in response to detecting the SAR trigger, the selected amount based on the determined current signal conditions and the predicted future signal conditions.

13. A mobile computing device as described in claim 12, wherein the specific absorption rate manager module is further operable to report data indicative of the selected amount of adjustment of the RF transmission power to a base station of the one or more base stations through which the mobile computing device is connected to service.

14. A mobile computing device as described in claim 13, wherein the data indicative of the selected amount of adjustment of the RF transmission power is included in a measurement report sent to the base station and effective to enable the base station to distinguish between power adjustments due to SAR mitigation and power adjustments due to other causes.

15. A mobile computing device as described in claim 12, wherein the selected amount of adjustment of the RF transmission power varies based upon the current RF transmission power.

16. A mobile computing device as described in claim 12, wherein adjusting the RF transmission power of the one or more antennas of the mobile computing device the selected amount comprises reducing the RF transmission power a variable amount when the predicted conditions and the current RF transmission power are indicative of a potential to exceed the SAR legal limits.

17. A mobile computing device as described in claim 12, wherein adjusting the RF transmission power of the one or more antennas of the mobile computing device the selected amount comprises maintaining the current RF transmission power when the current RF transmission power is sufficiently low to avoid exceeding the SAR legal limits.

18. A mobile computing device as described in claim 12, wherein adjusting the RF transmission power of the one or more antennas of the mobile computing device the selected amount comprises delaying a reduction of the RF transmission power when the predicted future signal conditions indicate that a change in signal strength is expected that will avoid exceeding the SAR legal limits.

19. A mobile computing device as described in claim 12, wherein detecting the SAR trigger comprises recognizing whether or not a user is present with respect to the one or more antennas via one or more user presence detectors provided with the mobile computing device.

20. A system comprising:
a mobile computing device having one or more antennas configured to provide wireless communication functionality;
hardware operable to connect the mobile computing device over a network to service available via a base station computing device; and
one or more tangible computer readable media comprising instructions that, when executed via the hardware, implement a specific absorption rate manager module operable to:
detect a specific absorption rate (SAR) trigger at the mobile computing device indicative of potential for non-compliance with SAR legal limits;
determine current signal conditions of the mobile computing device, the current signal conditions including a current radio-frequency (RF) transmission power of the one or more antennas of the mobile computing device for communicating with one or more base stations;
predict future signal conditions of the mobile computing device using a prediction model, the prediction model including a predicted RF transmission power for maintaining the communication of the one or more antennas of the mobile computing device with the one or more base stations over a future period of time and for satisfying the SAR legal limits over the future period of time, the prediction model configured to derive a predicted change over the future period of time in a received signal strength indicator (RSSI) detectable at the one or more base stations based on analysis of historical usage data for the mobile computing device; and
adjust the transmission power of the one or more antennas of the mobile computing device a selected amount in response to detecting the SAR trigger, the selected amount based on the determined current signal conditions and the predicted future signal conditions.

21. A mobile computing device as described in claim 20, wherein the specific absorption rate manager module is further operable to report data indicative of the selected amount of adjustment of the RF transmission power to a base station of the one or more base stations through which the mobile computing device is connected to service, the data that is reported effective to enable the base station to distinguish between power adjustments due to SAR mitigation and power adjustments due to other causes.

\* \* \* \* \*